Patented May 4, 1937

2,078,921

UNITED STATES PATENT OFFICE 2,078,921

COATING COMPOSITION

Alfonso M. Alvarado, Wilmington, Del., assignor to E. I. du Pont de Nemours & Company, Wilmington, Del., a corporation of Delaware No Drawing. Application November 28, 1933, Serial No. 700,159

1 Claims. (Cl. 134—51)

This invention relates to coating compositions, and more particularly to compositions containing asphalt which are especially useful in the manufacture of coated fabrics, automobile top material and artificial leather products in general.

Coating compositions comprising asphalts and drying oils, including China-wood oil, have been used for the top coat in finishing rubber coated fabrics. It has not, however, been possible in the prior practice to take advantage of the excellent compatibility of China-wood oil with asphalt because the heat treatment of the oil which has previously been used to overcome the tendency of the film to frost, decreases the compatibility of the oil with the asphalt, this leads to a decrease in the properties of durability and long retention of luster which are most desired in automobile top material and like products.

This invention has as an object the production of improved asphalt-containing coating compositions which dry to a smooth glossy film. A further object of this invention is the production of asphalt-raw China-wood oil coating compositions which dry to a smooth glossy film. A still further object of this invention is the manufacture of improved artificial leather products of the type consisting of fabrics, and more particularly rubber-coated fabrics, having a top coat of varnish comprised of asphalt and drying oil.

I have discovered that the exceptional compatibility of raw China-wood oil and asphalt may be utilized for the production of improved coated fabrics of the kind referred to above, and that the initial luster and luster retention qualities upon prolonged outdoor exposure of finishes of this type are remarkably enhanced by incorporation of certain compounds or agents into the asphalt-raw China-wood oil varnish, such as organic hydroxy compounds of low volatility, e. g., boiling above about 200° C. and preferably above 250° C., and which are soluble in either hydrocarbon solvents, or alcohols, or esters. Amino compounds of similar boiling point, volatility and solubility characteristics may also be used. The organic hydroxy compounds include high boiling monohydric alcohols, high boiling cyclic and alicyclic monohydric or polyhydric alcohols, mononuclear and polynuclear monohydric and polyhydric phenols which may or may not contain additional substituent groups, hydroxy organic acids, etc. The amino compounds include mononuclear amines such as toluidine, and polynuclear amines such as alpha- and beta-naphthylamines.

In the preferred method of making my new varnish, I blend a solution of the asphalt with a solution of the raw China-wood oil containing one or more of the agents just mentioned. The agent may be incorporated into the oil as a solution in alcohol or in an aromatic hydrocarbon solvent such as benzene, toluene, solvent naphtha, etc., or it may be incorporated into the oil by heat treatment for a sufficient time to effect complete solution of the agent in the oil, but insufficient to bring about appreciable bodying of the oil. The following examples will serve to illustrate the invention:

Example 1

|  | Parts |
|---|---|
| Steam refined petroleum residue asphalt | 100.0 |
| Raw China-wood oil | 59.7 |
| Hydroxydiphenyl (para) | 0.3 |
| Solvent naphtha | 160.0 |
| Iron resinate solution in solvent naphtha (2.4% Fe) | 25.0 |
|  | 345.0 |

Example 2

|  | Parts |
|---|---|
| Steam refined petroleum residue asphalt | 100.0 |
| Raw China-wood oil | 157.6 |
| Phenol | 2.4 |
| Solvent naphtha | 260.0 |
| Iron resinate solution in solvent naphtha (2.4% Fe) | 66.7 |
|  | 586.7 |

Example 3

|  | Parts |
|---|---|
| Steam refined petroleum residue asphalt | 100.0 |
| Raw China-wood oil | 117.6 |
| Syringic acid | 2.4 |
| Solvent naphtha | 220.0 |
| Iron oleate solution in solvent naphtha (4% Fe) | 30.0 |
|  | 470.0 |

Example 4

|  | Parts |
|---|---|
| Steam refined petroleum residue asphalt | 100.0 |
| Raw Japanese-wood oil | 77.6 |
| Diphenylguanidine | 2.4 |
| Solvent naphtha | 180.0 |
| Iron linoleate solution in solvent naphtha (2.7% Fe) | 33.4 |
|  | 393.4 |

Example 5

| | Parts |
|---|---|
| Steam refined petroleum residue asphalt | 100.0 |
| Raw China-wood oil | 78.4 |
| Naphthylamine (alpha) | 1.6 |
| Solvent naphtha | 180.0 |
| Lead resinate solution in solvent naphtha (5% Pb) | 4.0 |
| Manganese resinate solution in solvent naphtha (3.32% Mn) | 1.2 |
| | 365.2 |

Example 6

| | Parts |
|---|---|
| Blown petroleum residue asphalt | 100.0 |
| Raw China-wood oil | 157.6 |
| Naphthol (alpha) | 2.4 |
| Solvent naphtha | 260.0 |
| Lead resinate solution in solvent naphtha (5% Pb) | 8.0 |
| Manganese resinate solution in solvent naphtha (3.32% Mn) | 2.4 |
| | 530.4 |

Example 7

| | Parts |
|---|---|
| Blown petroleum residue asphalt | 100.0 |
| Raw oiticica oil | 99.5 |
| 1-benzyl-2-naphthol | 0.5 |
| Solvent naphtha | 200.0 |
| Iron laurate solution in solvent naphtha (4% Fe) | 25.0 |
| | 425.0 |

Example 8

| | Parts |
|---|---|
| Gilsonite | 13.44 |
| Raw China-wood oil | 24.89 |
| Pyrogallol | 0.03 |
| Lead-manganese resinate drier (6.42% Pb, 1.5% Mn) | 0.64 |
| China clay | 11.00 |
| Carbon black | 5.50 |
| Turpentine substitute | 44.50 |
| | 100.00 |

Example 9

| | Parts |
|---|---|
| Gilsonite | 10.81 |
| Raw China-wood oil | 26.11 |
| Benzyl alcohol | 0.67 |
| Iron oleate (4% Fe) | 3.35 |
| China clay | 11.00 |
| Carbon black | 5.50 |
| Turpentine substitute | 42.56 |
| | 100.00 |

Example 10

| | Parts |
|---|---|
| Gilsonite | 16.00 |
| Raw China-wood oil | 33.97 |
| Resorcinol | 0.69 |
| Lead-manganese resinate drier (6.42% Pb- 1.52% Mn) | 0.52 |
| Talc | 4.00 |
| Carbon black | 2.00 |
| Turpentine substitute | 42.82 |
| | 100.00 |

Example 11

| | Parts |
|---|---|
| Gilsonite | 14.00 |
| Raw China-wood oil | 37.62 |
| Creosol | 0.38 |
| Iron resinate (7.2% Fe) | 5.28 |
| China clay | 9.00 |
| Bone black | 3.00 |
| Turpentine substitute | 30.72 |
| | 100.00 |

Example 12

| | Parts |
|---|---|
| Gilsonite | 8.56 |
| Raw China-wood oil | 14.67 |
| Bodied linseed oil | 16.20 |
| Hydroxydiphenyl (ortho) | 0.03 |
| Iron resinate (7.2% Fe) | 2.02 |
| Prussian blue (45.5% Fe) | 0.52 |
| China clay | 4.00 |
| Carbon black | 4.00 |
| Turpentine substitute | 50.00 |
| | 100.00 |

Example 13

| | Parts |
|---|---|
| Gilsonite | 3.56 |
| Raw China-wood oil | 20.69 |
| Raw linseed oil | 10.90 |
| Naphthol (beta) | 0.21 |
| Iron resinate (7.2% Fe) | 4.30 |
| Carbon black | 8.00 |
| Turpentine substitute | 47.34 |
| | 100.00 |

Example 14

| | Parts |
|---|---|
| Gilsonite | 7.54 |
| Raw China-wood oil | 18.46 |
| China-wood oil acid | 8.15 |
| Abietic acid | 0.57 |
| Iron resinate (7.2% Fe) | 3.78 |
| China clay | 11.00 |
| Super-Spectra black | 6.00 |
| Solvent naphtha | 44.50 |
| | 100.00 |

All the asphalt-raw China-wood oil varnishes exemplified above have excellent durability and luster retention upon prolonged exposure to the weather when used as baked finishes for rubber coated fabrics. This excellent durability seems to be relatively independent of the gallon length of the varnishes, but I generally prefer to use high proportions of pigment in varnishes of longer gallon length than 20 gallons.

From 0.1 to 5% of the agent, based on the weight of the raw China-wood oil, may be used. In general, I prefer to use from 1 to 3% of the agent based on the weight of the oil. The exact proportion of the agent to be used depends to a large extent both upon the particular agent used and upon the gallon length of the varnish which it is desired to prepare. If varnishes of relatively long gallon length are desired, it is preferable to use as large a proportion of the agent as practicable. On the other hand, if varnishes of less than 15 gallons in oil length are desired, I prefer to use about 2% of the agent on the weight of the oil. Varnishes of less than 20 gallons in oil length are preferably prepared using petroleum residue asphalt, whereas varnishes of longer gallon length than 20 gallons are preferably prepared either with gilsonite or with a processed gilsonite having compatibility characteristics similar to those of gilsonite. By gallon length in the varnish trade is meant a gallon of oil to 100 pounds of gum. A gallon of oil is generally considered to weigh 8 pounds. Accordingly, a "gallon oil length", as used herein, designates 8 pounds of oil per 100 pounds of asphalt. As pointed out above, compositions up to 20 gallons in oil length are preferably prepared using petroleum residue asphalt and no pigment, whereas compositions of longer gallon length than 20 gallons are preferably prepared using gilsonite, or other natural asphalt having similar compatibility characteristics, and high proportions of pigment. In the pigmented varnishes, I prefer to use a pigment combination comprising an inert pigment and a carbon black, as for example, Super-Spectra black, microcosmic black, bone black, etc. The inert pigment may be china clay, asbestine, Super-Floss, or any of the inert pigments ordinarily used in paints and varnishes. Carbon black may be used alone, but in such cases the pigment content should be lowered to compensate for the oil absorption of the carbon-black. I prefer to use pigment contents varying from 12–40%, based on the solids content of the varnishes. The ratio of inert pigment to carbon black may be varied in any desired proportion, but I prefer to use from one to two parts by weight of the inert pigment to one of the carbon black. If it is desired to pigment varnishes of lower gallon length than 20 gallons, the percentage of high oil absorption pigment, e. g., carbon black, should be decreased and the percentage of low oil absorption pigments, e. g., china clay, increased. For example, in a 10 gallon varnish the carbon black is one-half, or preferably one-third, of the total pigment, the remainder being china clay or other low oil absorption pigment.

Addition of the agents described in this invention to asphalt-raw China-wood oil varnishes does not inhibit the drying qualities of these varnishes when they are applied over rubber-coated fabrics and the system baked at the vulcanizing temperature of the rubber. Moreover, addition of these agents does not in any way decrease the compatibility characteristics of the oil with the asphalt. Accordingly, using raw China-wood oil it is possible to prepare varnishes which have entirely satisfactory initial qualities in regard to luster, color, and smoothness of films up to 25 gallons in oil length, using petroleum residue asphalt, and even up to 50 gallons when gilsonite or other natural asphalt having similar compatibility characteristics as the asphalt.

Among the additional agents falling under the general type previously described which may be mentioned as being useful in the practice of my invention are phenols such as vanillic acid, nitro-phenol, eugenol, guaiacol, kojic acid, and resorcinol; guanidines such as diphenyl- and triphenyl-guanidines; aromatic alcohols such as benzyl alcohol, xylyl alcohol; high boiling aliphatic alcohols, such as methylheptanol; organic hydroxy acids such as tartaric, mucic malic, lactic, and citric acids; oil soluble phenol-formaldehyde resins containing some free phenol, etc.; rosin ester gum, congo ester and similar esterified acidic gums; polyalkylamides such as dimethyl adipamide, etc.; aromatic amines such as methyl-aniline, etc. Combinations of raw China-wood oil with other oils such as linseed oil, soya bean oil, Menhaden oil, free fatty acids derived from drying, semi-drying or non-drying oils, oil modified polyhydric alcohol-polybasic acid resins may be used in these varnishes.

The varnishes of this invention, preferably baked, are useful as finishes for rubber-coated fabrics, such as are used in automobile tops, rubber upholstery, etc. The following example describes the use of the varnishes of this invention in the manufacture of automobile top material. In this case the varnish is preferably applied over the uncured rubber, and the varnish dried by heating the system at a temperature which is suitable for the vulcanization of the rubber. In a modification of this process, which gives even better results in respect to initial appearance and durability, the varnishes are applied over an intermediate coat of oil varnish. In the one coat system outlined above, it is usual to bake at 240° F. to 270° F. for two to four hours to vulcanize the rubber and dry the varnish. In the two coat system, the intermediate coat of oil varnish is usually dried by baking at 240° F. to 270° F. for fifteen to thirty minutes, the final coat of asphalt varnish applied, and the system baked at 240° F. to 270° F. for two to four hours to vulcanize the rubber and dry the final coat of asphalt varnish. The particular temperature at which the system is baked, in either the one coat or two coat systems, is determined by the composition of the rubber compound. These varnishes may also be used as top dressings and in fender enamels.

The asphalt-raw China-wood oil varnishes made by the practice of this invention are superior to prior art varnishes in their excellent initial appearance and their durability on prolonged exposure to the weather. The superior compatibility is shown by the fact that varnishes up to 25 gallons in oil length can be prepared using steam refined petroleum residue asphalt, and these varnishes dry to smooth glossy films when they are applied over rubber-coated fabrics. In the absence of agents of the kind described above, asphalt-raw China-wood oil varnishes of longer gallon length than 7½ gallons (60 pounds of oil per 100 pounds of asphalt) are not satisfactory because of severe frosting upon drying. Accordingly, by using the procedure outlined herein, I have shown that it is possible to use raw China-wood oil in varnishes of considerably longer gallon length than has been hitherto possible. The practice of my invention makes it practicable to use raw China-wood oil, and other oleostearin containing oils in asphalt varnishes for use as finishes for rubber-coated fabrics and thereby obtain a finish which in addition to being free from frosting is, due to the increased compatibility obtained with the raw China-wood oil over that obtained with heat treated China-wood oil, markedly improved in durability, initial luster and capability of retaining the original high gloss upon long exposure to the weather. Twenty gallon steam refined petroleum residue asphalt-raw China-wood oil varnishes containing the agents described herein have excellent initial appearance, whereas steam refined petroleum residue asphalt-bodied China-wood oil varnishes of similar gallon length prepared by the prior art practice of heating the oil to prevent frosting have very poor initial appearance when they are prepared in the absence of driers. Moreover, 20 gallon steam refined petroleum residue asphalt-raw China-wood oil varnishes containing the agents described above dry satisfactorily upon baking for two and one-quarter to two and one-half hours (when applied over rubber-coated fabrics), even in the absence of driers, whereas varnishes of similar gallon length but containing China-wood oil bodied without driers are tacky initially when similarly applied and baked. The coated products of my invention have a high gloss, freedom from blueness, a deep black color, and excellent durability and retention of luster after long exposure to the weather.

As many apparently widely different embodiments of this invention may be made without departing from the spirit and scope thereof, it is to be understood that I do not limit myself to the specific embodiments thereof except as defined in the following claims:

I claim:

1. A coating composition, the films of which are substantially free from frosting and wrinkling upon drying, said composition comprising an anti-wrinkling agent and a homogeneous mixture of raw China-wood oil and asphalt containing between 60 and 400 pounds of raw China-wood oil for each hundred pounds of asphalt, said agent being selected from the class consisting of organic hydroxy compounds and amines, and having a boiling point above 200° C.

2. The composition of claim 1 in which the anti-wrinkling agent is para-hydroxydiphenyl and is present in amount from 0.1 to 5% of the weight of China-wood oil in the composition.

3. The composition of claim 1 in which the anti-wrinkling agent is beta-naphthol and is present in amount from 0.1 to 5% of the weight of China-wood oil in the composition.

4. The composition of claim 1 in which the anti-wrinkling agent is alpha-naphthylamine and is present in amount from 0.1 to 5% of the weight of China-wood oil in the composition.

ALFONSO M. ALVARADO.